US008612555B2

(12) United States Patent
Park

(10) Patent No.: US 8,612,555 B2
(45) Date of Patent: Dec. 17, 2013

(54) APPARATUS FOR MANAGING HOME-DEVICES REMOTELY IN HOME-NETWORK AND METHOD THEREOF

(75) Inventor: Chang-hawn Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1984 days.

(21) Appl. No.: 10/901,169

(22) Filed: Jul. 29, 2004

(65) Prior Publication Data

US 2005/0038875 A1 Feb. 17, 2005

(30) Foreign Application Priority Data

Aug. 11, 2003 (KR) ........................ 10-2003-0055303

(51) Int. Cl.
*G06F 15/177* (2006.01)
(52) U.S. Cl.
USPC ............................ 709/220; 709/221; 709/222
(58) Field of Classification Search
USPC ............ 709/219, 221, 223; 370/390; 340/3.1, 340/825.72
IPC .................................. H04B 1/00; G06F 17/60
See application file for complete search history.

(56) References Cited

U.S. PATENT DOCUMENTS

| 6,026,150 A * | 2/2000 | Frank et al. ................ 379/90.01 |
| 6,615,088 B1 * | 9/2003 | Myer et al. ....................... 700/20 |
| 6,795,846 B1 * | 9/2004 | Merriam ......................... 709/203 |
| 2002/0052950 A1 * | 5/2002 | Pillai et al. .................... 709/224 |
| 2002/0089427 A1 * | 7/2002 | Aratani et al. ............ 340/825.72 |
| 2002/0180579 A1 * | 12/2002 | Nagaoka et al. ................ 340/3.1 |
| 2003/0063608 A1 * | 4/2003 | Moonen ......................... 370/390 |
| 2003/0105854 A1 * | 6/2003 | Thorsteinsson et al. ...... 709/223 |

FOREIGN PATENT DOCUMENTS

| CN | 1398469 A | | 2/2003 |
| JP | 2001-53779 A | | 2/2001 |
| JP | 2002/297484 A | | 10/2002 |
| JP | 2002-297484 A | | 10/2002 |
| WO | WO 99/35753 | * | 1/1998 |
| WO | WO 99/35753 A2 | | 7/1999 |
| WO | WO 00/17789 | * | 9/1999 |
| WO | WO 00/17789 A1 | | 3/2000 |
| WO | WO 02/09350 A2 | | 1/2002 |

OTHER PUBLICATIONS

"Universal Plug and Play Device Architecture, UPnP, Version 1.0," published by Microsoft, Jun. 2000.*
Peter M. Corcoran, "Mapping Home-Network Appliances to TCP/IP Sockets Using a Three-Tiered Home Gateway Architecture", Dept. of Electronic Engineering, University College, Galway, vol. 44, No. 3, Aug. 1998, pp. 729-736, XP00051577.

(Continued)

*Primary Examiner* — Tae Kim
(74) *Attorney, Agent, or Firm* — Sughrue Mion, PLLC

(57) ABSTRACT

An apparatus for providing an interface between a home-network and a external network and remotely managing the home-device connected to the home-network. The apparatus includes a transmit data processing unit for transmitting information on the home-device to a provider server connected to the external network, and requesting environment setting data for setting a driving environment of the home-device; a receive data processing unit for receiving a response message based on the request, from the provider server, and extracting the environment setting data included in the response message; and an environment setting unit for setting the driving environment for the operation of the home-device, based on the environment setting data.

24 Claims, 4 Drawing Sheets

(56) References Cited

OTHER PUBLICATIONS

Joe Desbonnet, et al.. "System Architecture and Implementation of a CEBus/Internet Gateway", Dept. of Electronic Engineering, University College, Galway, Ireland, pp. 1057-1062, XP000768558, 1997.

Peter Pawlak, SQL Server 2000, Directions on Microsoft, pp. 21-26, 2002.

"Universal Plug and Play Device Architecture, UPnP, Version 1.0", Jun. 8, 2000, XP002210614.

Foreign Office Action dated Aug. 4, 2006 from Chinese Patent Office for related foreign application.

* cited by examiner

APPARATUS FOR MANAGING HOME-DEVICES REMOTELY IN HOME-NETWORK AND METHOD THEREOF

CROSS-REFERENCE TO RELATED APPLICATIONS

This application claims the benefit of Korean Patent Application No. 2003-55303 filed Aug. 11, 2003, in the Korean Intellectual Property Office, the disclosure of which is incorporated herein by reference.

BACKGROUND

1. Field of the Invention

The present invention relates to an apparatus for managing home-devices remotely in a home-network and a method thereof, and more particularly, to an apparatus for managing home-devices remotely in a home-network and a method thereof, wherein when adding a new home-device in the home-network, the driving environment of the home-device is remotely installed, and when updating the environment setting data of the existing home-device, the environment setting data is remotely updated.

2. Description of the Related Art

Generally, home-devices, that is, home appliances are classified into information system equipment such as a personal computer, facsimile, and scanner; A/V equipment such as a TV, set-top box, DVD, VCR, audio, camcorder, and home game device; controlling system equipment such as a coffee-maker, electric rice cooker, refrigerator, washing machine, microwave oven, and camera; and dummy equipment such as a remote controller, inter-phone, sensor, and lighter. These equipment are connected via a telephone line, wireless LAN or Bluetooth, USB, IEEE1394, and power line, respectively.

FIG. 1 illustrates the structure of a general home-network.

The home-network comprises a home gateway 110, PLC (Power Line Communication) Module 130, HomePNA (Home Phoneline Networking Alliance) Module 140, WLAN (wireless Local Area Network) Module 150, Ethernet Module 160, IEEE1394 Module 170, and Bluetooth Module 180. Each of the modules 130 through 180 is connected to the home gateway 110 via an internal bus line or a network line.

A provider server 120 is included in an external network, and is connected to the internet. The provider server 120 is a server holding environment setting data for setting a driving environment of the home-device, e.g., a drive code of the home-device, the provider server mainly being provided by a manufacturer of the home-device.

PLC Module 130, HomePNA Module 140, WLAN Module 150, Ethernet Module 160, IEEE1394 Module 170, and Bluetooth Module 180 are provided with means for receiving data from the home devices carrying out communications by respective protocols or transmitting the data to corresponding home devices.

The respective modules 130 through 180 are connected by networks such as a corresponding telephone line network, a power line network, Bluetooth network, and wireless LAN to carry out communication with the home devices constituting each of the networks. The home device 190 is connected by the power line network to carry out the communication by the PLC module 130.

The home network is connected to the internet via the home gateway 110. The home gateway 110 is a device for providing an interface between subscriber's network such as ADSL (Asymmetric Digital Subscriber Line) or VDSL (Very High Data Rate Digital Subscriber Line) and the home-network, and supports various protocols from a physical layer to a higher application. Also, the home gateway 110 operates 24 hours a day and hence provides a home with different types of multi-media services via the internet and connects the different types of home-devices to the home-network.

The function of the home gateway 110 is conventionally limited to data service, but now, the function of the home gateway 110 has become more complex due to support for multi-media services such as audio and video. Also, new products are being released for MPEG decoder, Codec, HomePNA, PLC, WLAN, Ethernet, VDSL/ADSL, cable modem, etc., or functions of an existing product are being added.

Thus, when a home device is added to the home-network that is managed by the home gateway 110 or a function of an existing device in the home-network is added to update the environment data thereof, loading the new home-device or new function varies depending on the communication means or configuration of the equipment.

However, there is a problem in that costs increase enormously if there are a lot of prospective customers whose service provider visits directly and updates the environment data. Also, when the customer directly connects to the provider server and updates the home-device, it is hard for the general customer who is not skilled in the field to directly work it, and if a problem occurs, then it is rather costly.

Additionally, when an outside manager automatically and remotely updates the environment data of the home device, there can be many methods of performing the updating, depending on the protocols used and the operating system. However, security problems can occur, and it is not easy for various home devices to be supported.

SUMMARY

In an effort to overcome the problems mentioned above, it is an aspect of the present invention to provide an apparatus for managing home-devices remotely in a home-network and a method thereof wherein when adding a new home-device in the home-network, a driving environment of the home-device is remotely installed, and when updating environment setting data of the existing home-devices, the environment setting data is remotely updated.

In an effort to achieve the above aspect and/or other features of the present invention, there is provided an apparatus for interfacing communications between a home-network and a external network and remotely managing a home-device being connected to the home-network, comprising: a transmit data processing unit for transmitting information on the home-device to a provider server being connected to the external network, and requesting environment setting data for setting a driving environment of the home-device; a receive data processing unit for receiving a response message on the request from the provider server, and extracting the environment setting data included in the response message; and an environment setting unit for setting the driving environment for the operation of the home-device, based on the environment setting data.

Preferably, the receive data processing unit further confirms whether or not a notification message notifying of the environment setting data of the home-device being updated, has been received from the provider server, and if the notification message has been received, the transmit data processing unit transmits the information on the home-device corresponding to the notification message to the provider server.

Preferably, the notification message includes at least one of a name and URL of a manufacturer of the home-device, a model name and model version of the home-device, a user's serial number, the time the environment setting data of the home-device is updated, and a user's IP address.

Preferably, if the home-device corresponding to the notification message is not connected to the home-network, the transmit data processing unit transmits an absence message indicating the absence of the home-device, to the provider server.

Preferably, the information on the home-device includes at least one of a name of the home-device, a name and web site of the manufacturer of the home-device, and a detailed model name and model serial number of the home-device. Also, it is desirable that the transmit data processing unit prepares a request message including the information on the home-device in XML(Extensible Markup Language)-based HTTP (Hypertext Transfer Protocol) data format.

Preferably, the response message includes at least one of model name, model version, model serial number, drive code, drive code version, drive code size, checksum, and drive hash algorithm of the home-device. Also, it is desirable that the response message is prepared by an XML-based HTTP data format.

Preferably, the receive data processing unit confirms whether or not the environment setting data has been normally received by verifying the checksum included in the response message of the home-device.

Preferably, the transmit data processing unit generates a complete message and transmits it to the provider server if the environment setting data has been normally received, and generates a failure message and transmits it to the provider server if the environment setting data has not been normally received.

Preferably, the complete message and/or the failure message includes at least one of a manufacturer's name of the home-device, a model name, model version, and model serial number of the home-device, and user's IP address. Also, it is desirable that the complete message and/or the failure message are prepared by an XML-based HTTP data format.

Preferably, the receive data processing unit confirms whether the environment setting data has been normally executed by experimentally executing the environment setting data included in the response message.

Preferably, the environment setting unit generates an execution script for executing the environment setting data, and transmits the environment setting data and the execution script to the home-device.

In an effort to achieve the above-discussed aspects and/or other features of the present invention, there is provided a method for interfacing communications between a home-network and a external network and remotely managing a home-device connected to the home-network, the method comprising the steps of: transmitting the information on the home-device to a provider server connected to the external network, and requesting environment setting data for setting a driving environment of the home-device; receiving a response message on the request from the provider server and extracting the environment setting data included in the response message; and setting the driving environment for the operation of the home-device, based on the environment setting data.

Preferably, the step of requesting the environment setting data further confirms whether or not a notification message notifying of the environment setting data of the home-device being updated has been received from the provider server; and the method further comprises if the notification message has been received, the step of transmitting the information on the home-device corresponding to the notification message, to the provider server and requesting the environment setting data for setting the driving environment for the operation of the home-device.

Preferably, the notification message includes at least one of a name and URL of the manufacturer of the home-device, a model name and model version of the home-device, user's serial number, the time the environment setting data of the home-device is updated, and the user's IP address.

Preferably, the step of requesting the environment setting data further includes transmitting an absence message indicating the absence of the home-device, to the provider server if the home-device corresponding to the notification message is not connected to the home-network.

Preferably, the information on the home-device includes at least one of a name of the home-device, name and web site of a manufacturer of the home-device, and detailed model name and model serial number of the home-device. Also, it is desirable that the step of requesting the environment setting data includes preparing a request message including the information on the home-device in XML-based HTTP data format.

Preferably, the response message includes at least one of a model name, model version, model serial number, drive code, drive code version, drive code size, checksum, and drive hash algorithm of the home-device. Also, it is desirable that the response message is prepared by an XML-based HTTP data format.

Preferably, the step of extracting the environment setting data confirms whether or not the environment setting data has been normally received by verifying the checksum included in the response message of the home-device.

Preferably, the step of requesting the environment setting data generates a complete message and transmits it to the provider server if the environment setting data has been normally received, and generates a failure message and transmits it to the provider server if the environment setting data has been not normally received.

Preferably, the complete message and/or the failure message include at least one of a manufacturer's name of the home-device, model name, model version, and model serial number of the home-device, and user's IP address. Also, it is desirable that the complete message and/or the failure message are prepared by an XML-based HTTP data format.

Preferably, the step of extracting the environment setting data confirms whether the environment setting data has been normally executed by experimentally executing the environment setting data included in the response message.

Preferably, the step of setting the driving environment includes generating an execution script for executing the environment setting data, and transmitting the environment setting data and the execution script to the home-device.

BRIEF DESCRIPTION OF THE DRAWINGS

The above aspects and other features of the present invention will become more apparent by describing in detail a preferred embodiment thereof with reference to the attached drawings, in which.

DETAILED DESCRIPTION OF THE PREFERRED EMBODIMENT

Hereinafter, the present invention will be described in detail with reference to the accompanying drawings.

Figure 1:
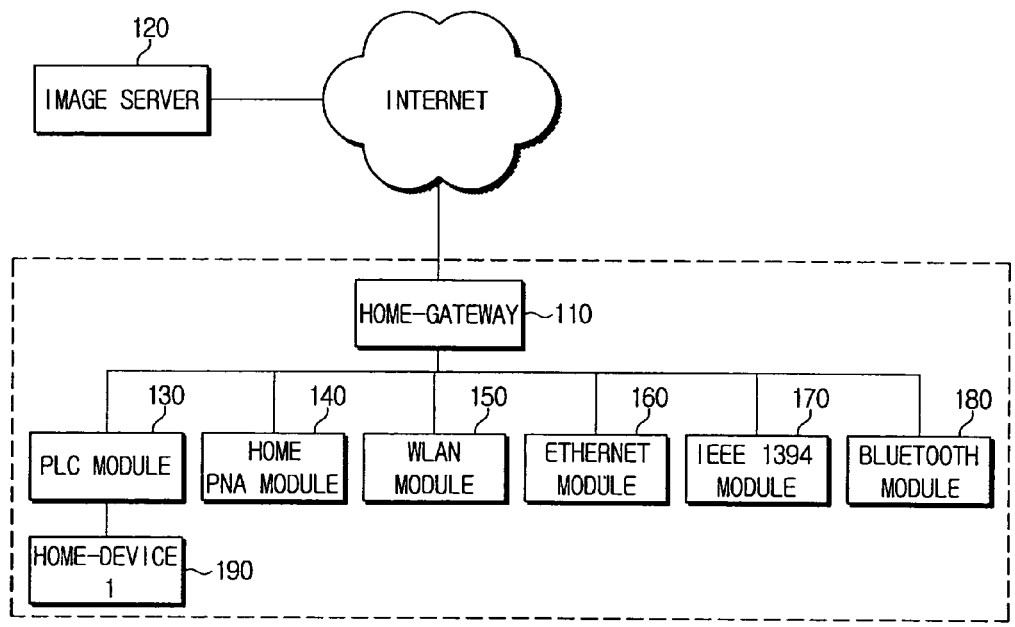
FIG. 1 illustrates the structure of a general home-network.
Figure 2:
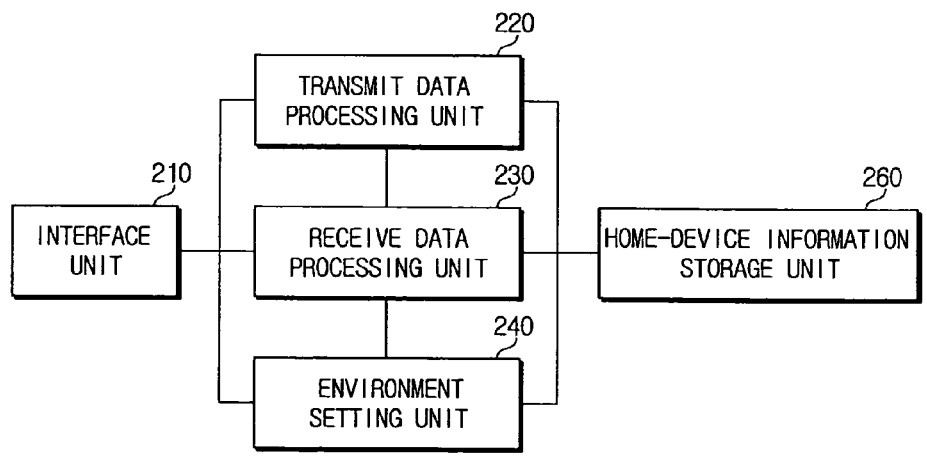
FIG. 2 illustrates the structure of a home-device remote management apparatus of the home-network according to the present invention.

FIG. 2 illustrates the structure of a home-device remote management apparatus of the home-network according to the present invention.

With reference to FIG. 2, the home-device remote management apparatus of the home-network comprises an interface unit 210, a transmit data processing unit 220, a receive data processing unit 230, and an environment setting unit 240.

The home-device remote management apparatus interfaces communications between the home-network and an external network via the interface unit 210. The external network is connected to a provider server, as described in the prior art, and the functions of the provider server are the same as described in the prior art except for the items described below. The home-device remote management apparatus uses SSL (Secure Socket Layer) TCP in order to safely communicate with the provider server.

The home-device remote management apparatus may further comprise a home-device information storage unit 260. However, the home-device remote management apparatus may use the existing memory without separately having the home-device information storage unit 260. The information on the home-device is stored on the home-device information storage unit 260. The information on the home-device includes a name of the home-device, name and web site of a manufacturer of the home-device, detailed model's name, and model serial number of the home-device. The home-device information storage unit 260 also may store environment setting data for setting the driving environment of the home-device, for example, a drive code.

The transmit data processing unit 220 transmits the information on the home-device to the provider server connected to the outside network that is coupled with the home-network, and requests the environment setting data for setting a driving environment of the home-device. As for the provider server, the web site of the company which produced the home-device is general and holds environment setting data of a corresponding home-device.

Also, it is desirable for the transmit data processing unit 220 to prepare a request message including the information on the retrieved home-device in an XML (Extensible Markup Language)-based HTTP (Hypertext Transfer Protocol) data format, in order to request the environment setting data for setting the driving environment of the home-device. It is desirable to prepare all the messages used in the communications between the provider server and the home-device remote-management apparatus in an XML-based HTTP data format.

The content of the request message includes the information on the home-device, i.e., name and URL of manufacturer, model name, model version, detailed model name, and model serial number of that home-device. The request message generated by the transmit data processing unit 220 is transmitted through the interface unit 210 to the provider server after setting the SSL/TCP connection with the provider server having URL of the manufacturer of the home-device.

The receive data processing unit 230 extracts the environment setting data of the home-device included in the response message that is transmitted by the provider server in response to the request and has it stored on the home-device information storage unit 260. The response message from the provider server includes model name, model version, model serial number of the home-device. Also, the response message includes actual drive code, drive code version, drive code size, checksum, and drive hash algorithm, etc. of the home-device.

The receive data processing unit 230 confirms the checksum included in the response message and verifies that the environment setting data of the home-device has been normally downloaded. Also, the receive data processing unit 230 experimentally loads the environment setting data of the home-device and verifies that the environment setting data of the home-device is normally executed.

The receive data processing unit 230 receives the response message from the provider server and verifies whether the environment setting data of the home-device is normally received. If the environment setting data of the home-device is normally executed, the transmit data processing unit 220 generates the complete message and transmits it to the provider server. However, if the receive data processing unit 230 does not receive the response message from the provider server, or the environment setting data of the home-device is normally received by a lot of reasons even if it has been received, the transmit data processing unit 220 generates the failure message and transmits it to the provider server.

The complete message includes a manufacturer's name, model name, model version, model serial number of the home-device, and user's IP address, and the failure message includes a manufacturer's name, model name, model version, model serial number of the home-device, and user's IP address.

The environment setting unit 240 generates an execution script for executing the environment setting data. The execution script is a script for executing the environment setting data, and a kind of the execution file that is developed in order to be able to be transmitted to a pertinent home-device to execute the environment setting data.

The environment setting unit 240 transmits the environment setting data of the home-device and its the execution script through the interface unit 210 to the home-device, and sets the driving environment of the home-device so that the home-device can perform the loading and communicate in the home-network.

The transmit data processing unit 220, if a new home-device is found in the home-network, retrieves the information on the found home-device. The information on the home-device includes, for example, name and manufacturer of the home-device described above, and can be retrieved through the network's middleware or PCI (Peripheral Component Interconnect) information search according to the connection scheme of the home-device.

The transmit data processing unit 220 transmits the response message, the complete message, and the failure message through the interface unit 210 to the provider server. Also, the transmit data processing unit 220 confirms whether the receive data processing unit 230 has received from the provider server, a notification message which notifies of the environment setting data of the home-device being updated.

When the environment setting data of the home-device is updated, the notification message is a message that is generated by the provider server holding the environment setting data of a pertinent home-device and is transmitted to the home-device remote management apparatus of each of the home-network. The provider server prepares a corresponding update notification message in XML format and transmits it the home-device remote management apparatus of the respective users who have purchased the corresponding home-device and refers to the list of users registered in the provider server.

The content of the notification message includes the information on the home-device, i.e., name and URL of manufacturer of the home-device, model name and model version of the home-device, the user's serial number, the time the home-device drive is updated, and the user's IP address.

When the home-device corresponding to the home-device information included in the notification message is connected to the home-network, the transmit data processing unit 220 transmits the information on the home-device to the provider server and requests the updated environment setting data of the home-device.

The home-device remote management apparatus according to the present invention as described above may be implemented by being mounted on the existing home-gateway or by extending the function of the home-gateway. Accordingly, the home-device remote-management apparatus remotely and automatically installs and updates the environment setting data of the home-device without intervention of the user when the home-device is added to the home-network or the environment setting data of the home-device is updated.

Figure 3A:
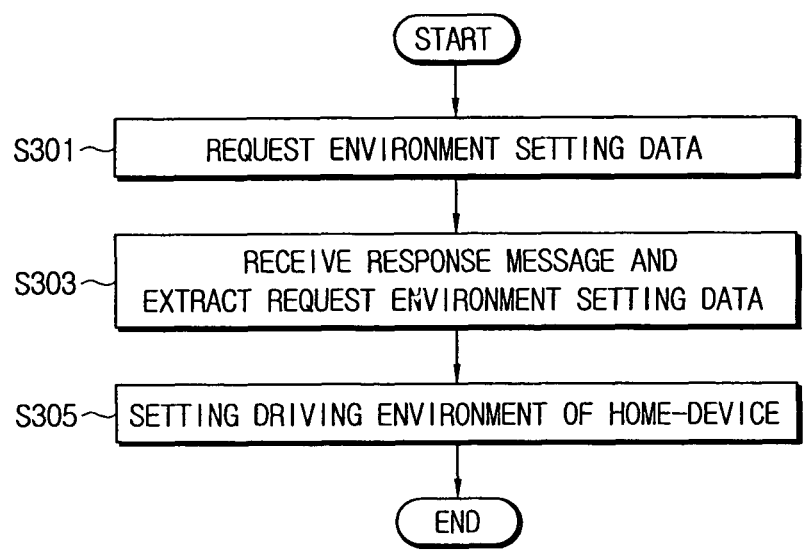
FIG. 3A is a schematic flow chart illustrating a home-device remote management method of the home-network according to the present invention.
Figure 3B:
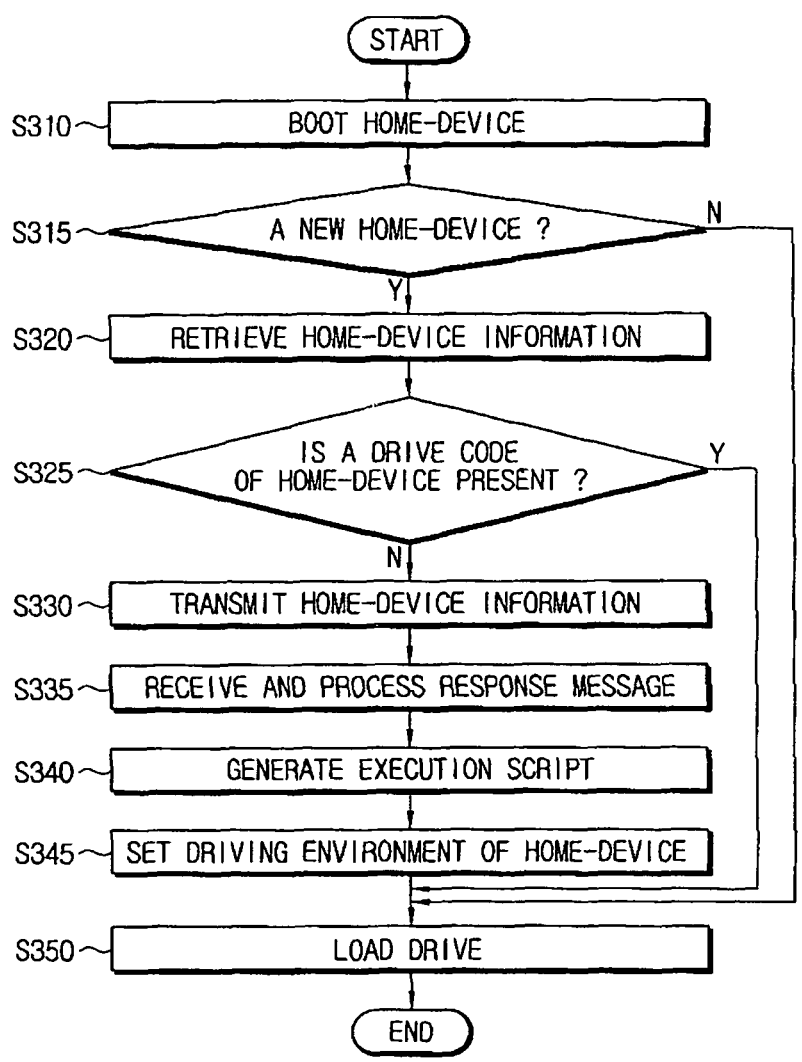
FIG. 3B is a detailed flow chart illustrating a home-device remote management method of the home-network according to the present invention.

FIG. 3A is a schematic flow chart illustrating the home-device remote management method of the home-network according to the present invention, and FIG. 3B is a detailed flow chart illustrating the home-device remote management method of the home-network according to the present invention. Hereinafter, with reference to FIG. 3A and FIG. 3B, the present invention will be described in detail.

First, the detailed description begins with the step (S301) which involves the transmission of the information related to the home-device to the provider server connected to the external network and requesting the environment setting data for setting the driving environment of the home-device.

When the home-device is powered-up and booted (S310), different types of hardware information are initialized. If the hardware information is initialized, the home-device remote management apparatus determines whether the home-device is a new home-device (S315). In order to find the new home-device, various tools known to those skilled in the art are used depending on the operating system used, and the detailed description thereof will be omitted.

If the new home-device is found, the information on the found home-device is retrieved (S320). If the way the home-device is connected in the home-network is a network type, the information on the home-device may be confirmed through the middleware of the network, and if the way the home-device is connected in the home-network is a bus type, the information on the home-device may be confirmed, for example, through PCI information search.

The information on the home-device is transmitted to the home-device remote management apparatus, and the home-device remote management apparatus retrieves whether there is the environment setting data of the home-device according to the transmitted home-device information (S325).

When there is environment setting data of the home-device, the retrieved environment setting data of the home-device is transmitted to a new home-device. However, when the home-device is a home appliance, as in a PLC module, the environment setting data of the home-device may be transmitted to a location where the environment setting data of the home-device is loaded.

When there is no environment setting data of the home-device in the home-device remote management apparatus, the request message requesting the environment setting data of the home-device is prepared in XML format and is transmitted to the provider server (S330). The content of the request message is the same as described above.

Next, detailed description is made of the step (303) in which the response message for the request from the provider server is received and the environment setting data included in the response message is extracted.

The provider server receiving the request message uses a corresponding model serial number to confirm a corresponding home-device, finds the environment setting data for setting the driving environment of the home-device matching the information on the home-device, and transmits it to the home-device remote management apparatus with being included in the response message.

If the response message for the request message is received from the provider server, the home-device remote-management apparatus processes the response message (S335). Since the response message includes the environment setting data of the home-device, the reception of the response message is accomplished by setting SSL-based TCP connection in order to safely communicate between the home-device remote management apparatus and the provider server. As a process of the response message, the home-device remote-management apparatus confirms whether or not the environment setting data is normally received by verifying the checksum included in the response message of the home-device.

Also, it is desirable that the home-device remote management apparatus confirms whether the environment setting data is normally carried out by temporarily and experimentally loading the environment setting data included in the received response message. The experimental loading method uses one of various tools. One of them is the tool that provides temporal hardware environment for loading the environment setting data, loads the environment setting data, removes the temporally provided hardware environment if the loading is normally carried out, and notifies the home-device that loading was normally carried out.

Finally, the detailed description is made of the step (S305) in which the driving environment for operating the home-device is set, based on the environment setting data included in the transmitted response message.

If it is confirmed that the environment setting data of the home-device has been normally received, the home-device remote management apparatus generates an execution script for executing the environment setting data of the home-device (S340). Then, the home-device remote management apparatus transmits the environment setting data of the home-device and its execution script to a pertinent home-device (S345). The location where the environment setting data of the home-device and its execution script are transmitted may, of course, be the location where the environment setting data of the home-device is loaded as described above. The home-device executes the transmitted execution script and loads the environment setting data of the home-device (S350), thereby performing the operation and carrying out the communication in the home-network.

Figure 4:
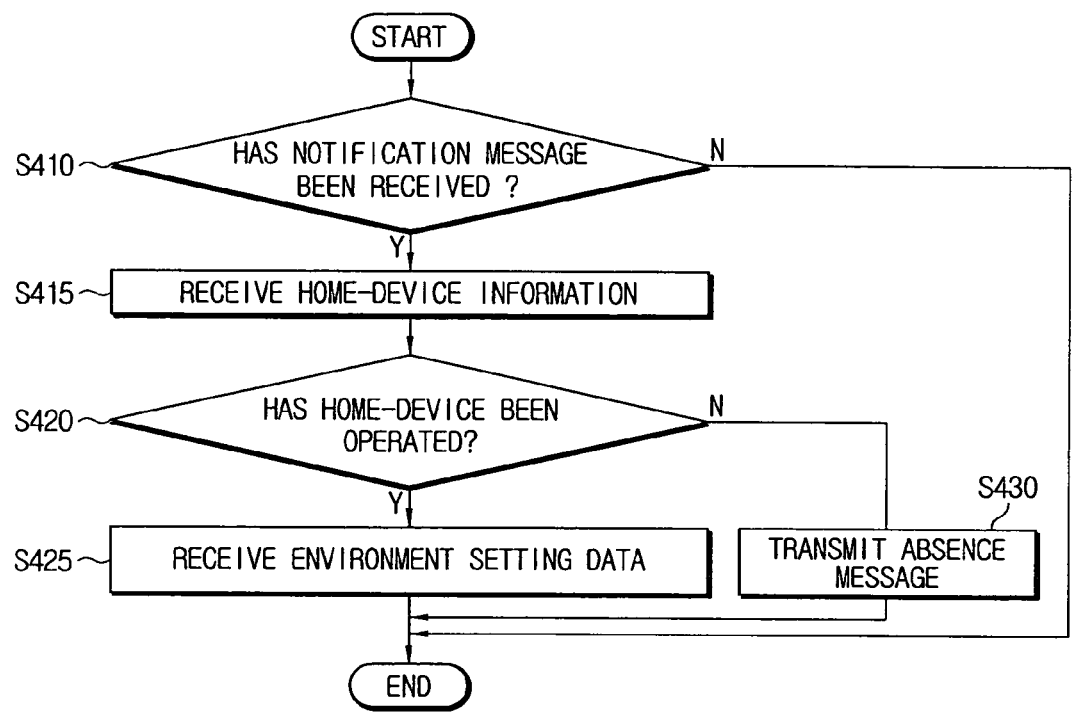
FIG. 4 is a flow chart illustrating a home-device remote management method of another home-network according to the present invention.

FIG. 4 is a flow chart illustrating a home-device remote management method of another home-network according to the present invention. FIG. 4 describes a home-device remote management method in a case where the environment setting data of an existing home-device is updated.

If the environment setting data of the home-device is updated, the provider server which holds the environment setting data of a pertinent home-device generates a notification message notifying of the updating in XML format, and transmits the notification message to the home-device remote management apparatus of respective home-networks.

The home-device remote management apparatus confirms whether the notification message has been received (S410). If the notification message has been received, the home-device remote management apparatus retrieves the information on the home-device in order to confirm whether the home-device indicated by the notification message is present in the home-network that the apparatus manages (S415), and confirms whether a pertinent home-device is operated in the home-network that the apparatus manages (S420).

If the operation of the home-device is confirmed, the home-device remote management apparatus generates a request message requesting the environment setting data of the home-device as described above, transmits it to the provider server, receives the response message, and extracts the environment setting data of the home-device (S425). The procedures of the detailed operation on this matter are the same as the case that found the new home-device.

On the other hand, when a pertinent home-device is not operated in the home-network, the home-device remote management apparatus generates an absence message and transmits it the provider server (S430). The absence message includes a manufacturer's name of the home-device, model name, model version, and model serial number of the home-device, and a user's IP address.

So far, the home-device remote management apparatus and the method have been described which automatically install and update the environment setting data for setting the driving environment of the home-device when a new home-device is found in the home-network and when the environment setting data of the home-device is updated. The home-device remote management apparatus of the present invention may be implemented by mounting it on a general home gateway.

In accordance with the home-device remote-management apparatus and the method of the present invention, when a new home-device is added to the home-network and the environment setting data of the home-device is updated, it is possible to automatically install and update the environment setting data for setting the driving environment of the home-device without the intervention of the user.

Accordingly, when a new home-device is newly added to the home-network, or the environment setting data of the home-device is updated, there is no need for a general user to directly carry out the work for loading the home-device, and hence no security problem is generated. Also, it is possible to sufficiently support a variety of home-devices, and to efficiently cope with the environment change of the home-network at an economical cost.

Although a few preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. An apparatus for providing a communication interface between a home-network and an external network, and remotely managing a home-device connected to the home-network, comprising:
a transmit data processing unit for transmitting information on the home-device to a provider server connected to the external network, and requesting environment setting data for setting a driving environment of the home-device;
a receive data processing unit for receiving a response message based on the request, from the provider server, and extracting the environment setting data included in the response message, the response message including a drive hash algorithm of the home-device,
wherein the driving environment for operation of the home-device is set based on the environment setting data, said home-device being one of a new home-device and an existing home-device,
wherein when the new home-device is added to the home-network, the driving environment is set using environment setting data following: the transmit data processing unit transmitting the information on the new home-device and requesting the environment setting data at an instant the new home-device is added to the home-network,
wherein when the existing home-device is updated, the driving environment is set using the updated environment setting data following: the transmit data processing unit transmitting the information on the existing home-device and the receive data processing unit receiving the response message based on the request and extracting the environment setting data,
wherein the receive data processing unit confirms whether or not a notification message notifying of the environment setting data of the home-device being updated, has been received from the provider server,
wherein if the notification message has been received, the transmit data processing unit transmits the information on the home-device corresponding to the notification message to the provider server, and
wherein if the home-device corresponding to the notification message is not connected to the home-network, the transmit data processing unit transmits an absence message indicating an absence of the home-device, to the provider server.

2. The apparatus of claim 1, wherein the notification message includes at least one of a name and uniform resource locater (URL) of a manufacturer of the home-device, a model name and model version of the home-device, a user's serial number, a time the environment setting data of the home-device is updated, and a user's IP address.

3. The apparatus of claim 1, wherein the information on the home-device includes at least one of a name of the home-device, a name and web site of a manufacturer of the home-device, and a detailed model name and model serial number of the home-device.

4. The apparatus of claim 3, wherein the transmit data processing unit prepares a request message including the information on the home-device in XML(Extensible Markup Language)-based HTTP(Hypertext Transfer Protocol) data format.

5. The apparatus of claim 1, wherein the response message further includes at least one of a model name, a model version, a model serial number, a drive code, a drive code version, a drive code size, and a checksum.

6. The apparatus of claim 5, wherein the response message is prepared according to an XML (Extensible Markup Language)-based HTTP (Hypertext Transfer Protocol) data format.

7. The apparatus of claim 5, wherein the receive data processing unit confirms whether or not the environment setting data has been normally received by verifying the checksum that is included in the response message of the home-device.

8. The apparatus of claim 7, wherein the transmit data processing unit generates a complete message and transmits it to the provider server if the environment setting data has been normally received, and generates a failure message and transmits the failure message to the provider server if the environment setting data has not been normally received.

9. The apparatus of claim 8, wherein at least one of the complete message and the failure message includes at least one of a manufacturer's name of the home-device, a model name, a model version, and a model serial number of the home-device, and a user's IP address.

10. The apparatus of claim 8, wherein at least one of the complete message and the failure message are prepared according to an XML-based HTTP data format.

11. The apparatus of claim 1, wherein the receive data processing unit confirms whether the environment setting data has been normally executed by experimentally executing the environment setting data included in the response message.

12. The apparatus of claim 1, wherein an execution script for executing the environment setting data is generated, and the environment setting data and the execution script are transmitted to the home-device.

13. A method for communicating between a home-network and an external network and remotely managing a home-device connected to the home-network, the method comprising:
    transmitting information on the home-device to a provider server connected to the external network, and requesting first environment setting data for setting a driving environment of the home-device, the home-device being one of a new home-device and an existing home-device;
    receiving a response message based on the request, from the provider server and extracting the first environment setting data included in the response message, wherein the response message includes a drive hash algorithm of the home-device; and
    at the instant the new home-device is added to the home-network and when second environment setting data of the existing home-device is updated, setting the driving environment for the operation of the home-device after the transmitting, receiving, and extracting operations, based on the environment setting data,
    wherein requesting the first environment setting data includes confirming whether or not a notification message notifying of the first environment setting data of the home-device being updated, has been received from the provider server;
    said method further comprising if the notification message has been received, transmitting the information on the home-device corresponding to the notification message to the provider server and requesting the first environment setting data for setting the driving environment for the operation of the home-device, and
    wherein when requesting the first environment setting data, an absence message indicating the absence of the home-device is transmitted to the provider server, if the home-device corresponding to the notification message is not connected to the home-network.

14. The method of claim 12, wherein the notification message includes at least one of a name and uniform source locator (URL) of a manufacturer of the home-device, model name and model version of the home-device, a user's serial number, the time the first environment setting data of the home-device is updated, and a user's IP address.

15. The method of claim 14, wherein the information on the home-device includes at least one of a name of the home-device, a name and web site of manufacturer of the home-device, and a detailed model name and model serial number of the home-device.

16. The method of claim 15, wherein requesting the first environment setting data includes preparing a request message including the information on the home-device in XML (Extensible Markup Language)-based HTTP (Hypertext Transfer Protocol) data format.

17. The method of claim 13, wherein the response message further includes at least one of a model name, a model version, a model serial number, a drive code, a drive code version, a drive code size, and a checksum.

18. The method of claim 17, wherein the response message is prepared in XML(Extensible Markup Language)-based HTTP (Hypertext Transfer Protocol) data format.

19. The method of claim 18, wherein the extracting of the first environment setting data includes confirming whether or not the environment setting data has been normally received by verifying the checksum included in the response message from the provider server.

20. The method of claim 19, wherein the requesting of the environment setting data includes generating a complete message and transmitting it to the provider server if the first environment setting data has been normally received, and generating a failure message and transmitting it to the provider server if the first environment setting data has not been normally received.

21. The method of claim 20, wherein at least one of the complete message and the failure message includes at least one of a manufacturer's name of the home-device, the model name, the model version, and the model serial number of the home-device, and a user's IP address.

22. The method of claim 20, wherein at least one of the complete message and the failure message are prepared based on an XML-based HTTP data format.

23. The method of claim 13, wherein the extracting of the first environment setting data includes confirming whether the environment setting data has been normally executed, by experimentally executing the first environment setting data included in the response message.

24. The device of claim 13, wherein the setting of the driving environment includes generating an execution script for executing the first environment setting data, and transmitting the first environment setting data and the execution script to the home-device.

* * * * *